(12) United States Patent
Tkadlec

(10) Patent No.: US 7,385,325 B2
(45) Date of Patent: Jun. 10, 2008

(54) MAGNETIC PROPULSION MOTOR

(75) Inventor: Mike Tkadlec, Oakdale, MN (US)

(73) Assignee: Future Force, LLC, Lakeville, MN (US)

( * ) Notice: Subject to any disclaimer, the term of this patent is extended or adjusted under 35 U.S.C. 154(b) by 0 days.

(21) Appl. No.: 11/617,852

(22) Filed: Dec. 29, 2006

(65) Prior Publication Data
US 2007/0145845 A1    Jun. 28, 2007

Related U.S. Application Data

(63) Continuation of application No. PCT/US2005/023704, filed on Jun. 30, 2005.

(60) Provisional application No. 60/584,298, filed on Jun. 30, 2004.

(51) Int. Cl.
*H02K 7/06* (2006.01)
(52) U.S. Cl. .................................. 310/80; 310/152
(58) Field of Classification Search ................. 310/80, 310/112, 152
See application file for complete search history.

(56) References Cited

U.S. PATENT DOCUMENTS

| 4,600,849 | A | | 7/1986 | Lawson et al. |
|---|---|---|---|---|
| 6,084,322 | A | * | 7/2000 | Rounds ........................ 310/46 |
| 6,433,453 | B1 | * | 8/2002 | Kitayoshi .............. 310/156.01 |
| 6,867,514 | B2 | | 3/2005 | Fecera |
| 6,930,421 | B2 | | 8/2005 | Wise |
| 2004/0041479 | A1 | * | 3/2004 | French ........................ 310/105 |

OTHER PUBLICATIONS

PCT Search Report (3 pgs.), dated Sep. 25, 2006.

* cited by examiner

*Primary Examiner*—Nguyen N Hanh
(74) *Attorney, Agent, or Firm*—Dorsey & Whitney LLP; Nathan J. Witzany

(57) ABSTRACT

The present invention relates to a magnetic propulsion motor comprising a magnetic drive assembly comprising a drive magnet, a rotating hub, and a motion magnet attached to the rotating hub to rotate the motion magnet proximate to the magnetic drive assembly. A driving force is applied to the magnetic drive assembly, which causes the drive magnet to rotate to a position proximal to the motion magnet when the motion magnet is in a position proximate to the magnetic drive assembly. This arrangement exerts a repelling force on the motion magnet from the drive magnet as the motion magnet rotates away from the magnetic drive assembly. The rotation of the drive magnet also rotates the drive magnet to a position distal to the motion magnet as the motion magnet approaches the position proximate to the magnet drive assembly thereby minimizes the repelling force exerted on the motion magnet from the drive magnet as the motion magnet rotates towards the magnetic drive assembly.

14 Claims, 13 Drawing Sheets

MAGNETIC PROPULSION MOTOR

CROSS-REFERENCE TO RELATED APPLICATION(S)

This application is a continuation of International application number PCT/US2005/023704, filed Jun. 30, 2005, which claims priority to U.S. provisional patent application Ser. No. 60/584,298, filed Jun. 30, 2004, the contents of both are incorporated herein by reference in their entirety.

FIELD OF THE INVENTION

The present invention relates to a magnetic propulsion motor. In particular, the present invention relates to a motor, wherein power is generated using magnets and magnetic fields. Magnets are accelerated through the magnetic fields creating a rotational movement about an axis.

BACKGROUND OF THE INVENTION

Magnetic propulsion has traditionally not worked effectively in the past due to magnetic lock. That is, it takes as much energy to enter into a magnetic field as is generated leaving the field. However, if push or "drive" magnets are taken out of position to affect the conflicting magnetic field created by the motion magnets, and then brought back into the proper position at the appropriate time, magnetic lock can be mitigated or bypassed.

Current magnetic propulsion motors have not been effective in diminishing or eliminating magnetic lock. Current motors use a magnetic field that creates either an attracting force or a repelling force, but not both. Additionally, current motors do not take into consideration the shape of the motion magnets or the effect, in certain configurations, that magnetic shielding can have. Thus, current motors are generally inefficient.

Therefore, there is a need in the art for a magnetic propulsion motor that eliminates or mitigates magnetic lock. The present invention relates to a magnetic propulsion motor without the disadvantages of current motors.

BRIEF SUMMARY OF THE INVENTION

The present invention relates to a magnetic propulsion motor comprising a magnetic drive assembly comprising a drive magnet, a rotating hub, and a motion magnet attached to the rotating hub to rotate the motion magnet proximate to the magnetic drive assembly. A driving force is applied to the magnetic drive assembly, which causes the drive magnet to rotate to a position proximal to the motion magnet when the motion magnet is in a position proximate to the magnetic drive assembly. This arrangement exerts a repelling force on the motion magnet from the drive magnet as the motion magnet rotates away from the magnetic drive assembly. The rotation of the drive magnet also rotates the drive magnet to a position distal to the motion magnet as the motion magnet approaches the position proximate to the magnet drive assembly thereby minimizes the repelling force exerted on the motion magnet from the drive magnet as the motion magnet rotates towards the magnetic drive assembly.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The present invention relates to a magnetic propulsion motor. More specifically, the present invention relates to a system and method of generating power by using magnets and magnetic fields. An output of power is obtained from rotating motion magnets through one or more magnetic acceleration fields created by push magnets.

Figure 1:
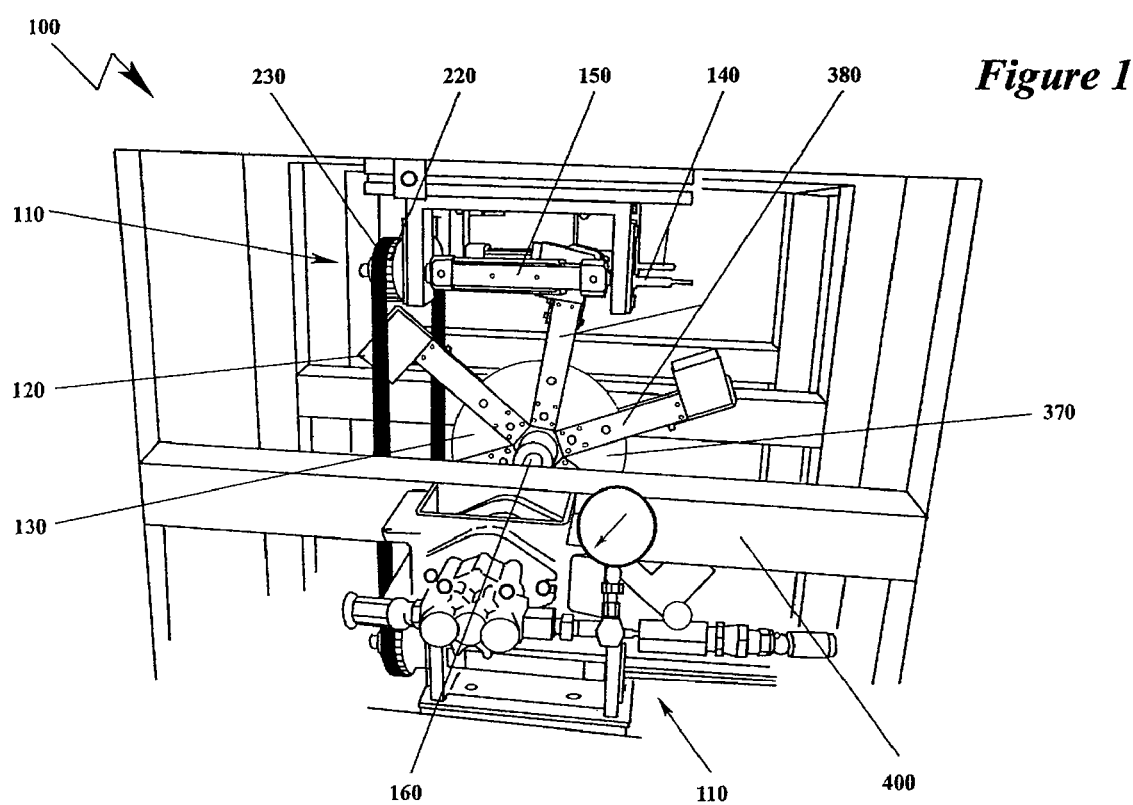
FIG. 1 is a side view of one embodiment of the magnetic propulsion motor of the present invention.

According to one embodiment of the present invention shown in FIG. 1, a magnetic propulsion motor 100 comprises at least one acceleration chamber 105 (shown in FIG. 2) within main frame 400. Each acceleration chamber 105 includes at least one acceleration field generator 110 and at least one motion magnet 120 and a rotating hub 130 coupled thereto. As described in more detail below and shown in FIG. 9, the rotating hub 130 generally comprises a base 370 and an extension arm 380 for each motion magnet 120. The extension arm 380 secures the motion magnet 120 to the base 370.

Figure 3:
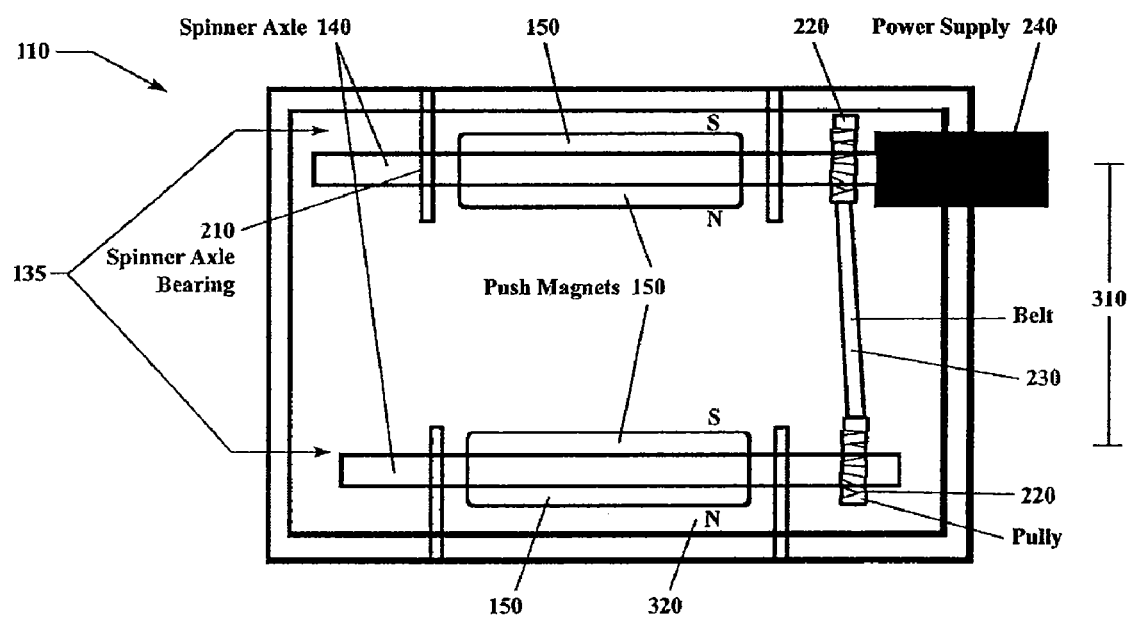
FIG. 3 is a schematic view of one embodiment of the acceleration field generator of the present invention.
Figure 4:
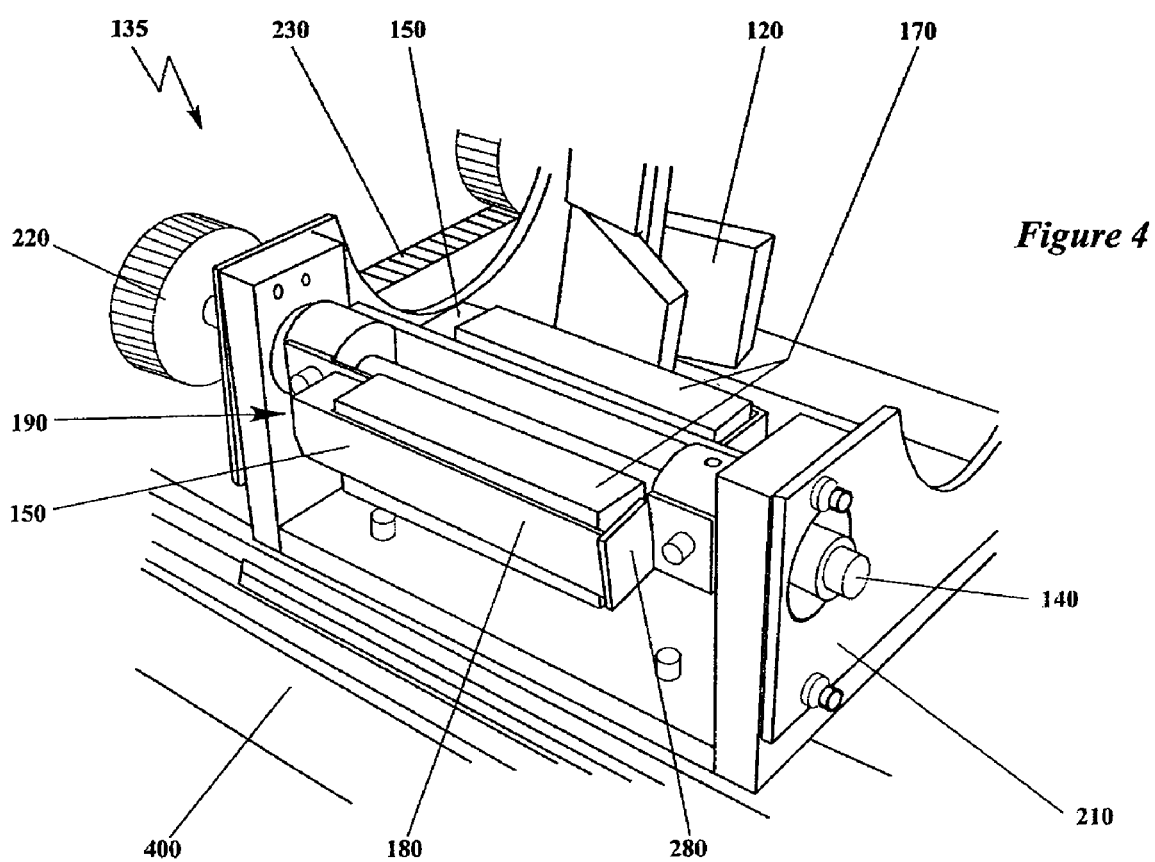
FIG. 4 is a perspective view of one embodiment of the spinner assembly of the present invention.

The rotation of the rotating hub 130 causes each motion magnet 120 to pass through a magnetic acceleration field created by the acceleration field generator 110. With reference to FIGS. 1 and 3, an acceleration field generator 110 comprises two spinner assemblies 135, each spinner assembly 135 having a spinner axle 140 and two push magnets 150. As seen in FIG. 4, spinner assembly 135 further includes two magnet cradles 170, each magnet cradle 170 rotatably coupling the push magnets 150 to spinner axle 140 such that two push magnets 150 freely rotate, or "spin," about the spinner axle 140. An acceleration chamber within the main frame 400 further comprises a main axle 160 coupled with the rotating hub 130. The rotating hub 130 is rotationally secured to the main axle 160 such that hub 130 and motion magnets 120 may rotate about the axle 160.

Figure 2:
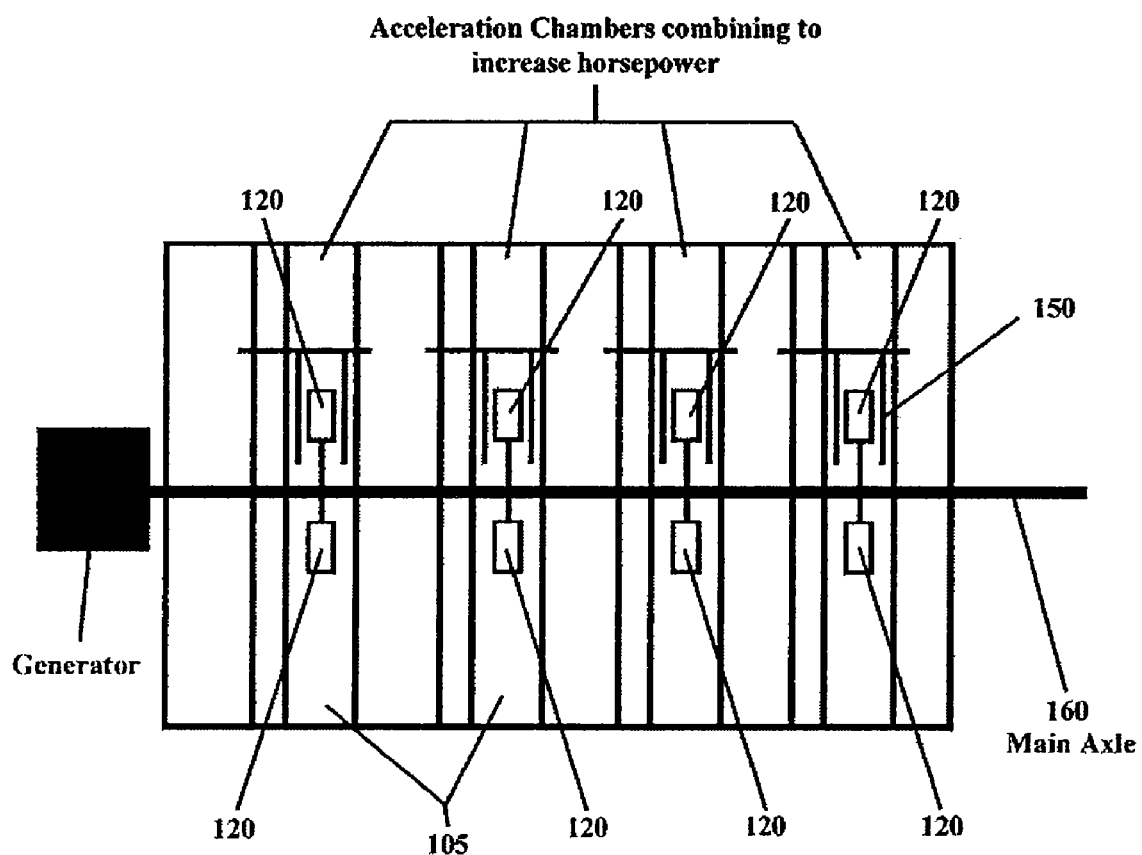
FIG. 2 is a schematic view of one embodiment of a multiple chamber, magnetic propulsion motor of the present invention.

In alternate embodiments, it may be desirable for the magnetic propulsion motor 100 to have multiple chambers 105, as shown in FIG. 2. In such situations, the rotating hub 130 of each chamber 105 may be coupled with a separate axle 160. Alternatively, the rotating hub 130 of any one of the chambers 105 may share an axle 160 with any number of hubs 130 of the remaining chambers 105. Where multiple hubs 130 share the same axle 160, torque and power are increased. Therefore, any desired amount of power can be achieved by adding more chambers 105.

In one embodiment of the present invention, a magnetic propulsion motor 100 comprises two acceleration field generators 110. In other embodiments, it may be desirable to have more or fewer acceleration field generators 110. Typically, the acceleration field generators 110 are evenly placed circumferentially around the rotating hub 130 such that the motion magnets 120 pass through the acceleration field created by each of the acceleration field generators 110, as will be described in further detail.

With reference to FIGS. 3 and 4, an acceleration field generator 110 generally comprises two spinner assemblies 135. In alternate embodiments, an acceleration field generator 110 may comprise more or fewer spinner assemblies 135. Each spinner assembly 135 has two push magnets 150 which are securely attached to a spinner axle 140 by housing each push magnet 150 in a magnet cradle 170 rotatably attached to the spinner axle 140 and which rotates relative the spinner axle 140. In alternate embodiments, each spinner assembly 135 may comprise more or fewer push magnets 150. The push magnets 150 are typically situated on substantially opposing sides of the spinner axle 140. The push magnets 150 may be neodymium iron boron (neodymium) rare earth magnets. However, those skilled in the art will recognize that other known magnets may also be used for the push magnets 150.

In addition to housing and securing push magnets 150, the magnet cradle 170 may provide magnetic shielding for push magnets 150, wherein the cradle 170 covers all or part of some of the faces of the push magnet 150 and appropriately redirects the magnetic force emanating from those faces. Because a magnetic field must always start at one pole and end at the other, magnetic shielding does not actually block a magnetic field. However, magnetic shielding may redirect a magnetic field through the shield, similar to a conductor, so that the magnetic field has lessened or no influence on objects passing by the magnet or side of the magnet that has magnetic shielding.

Figure 5A:
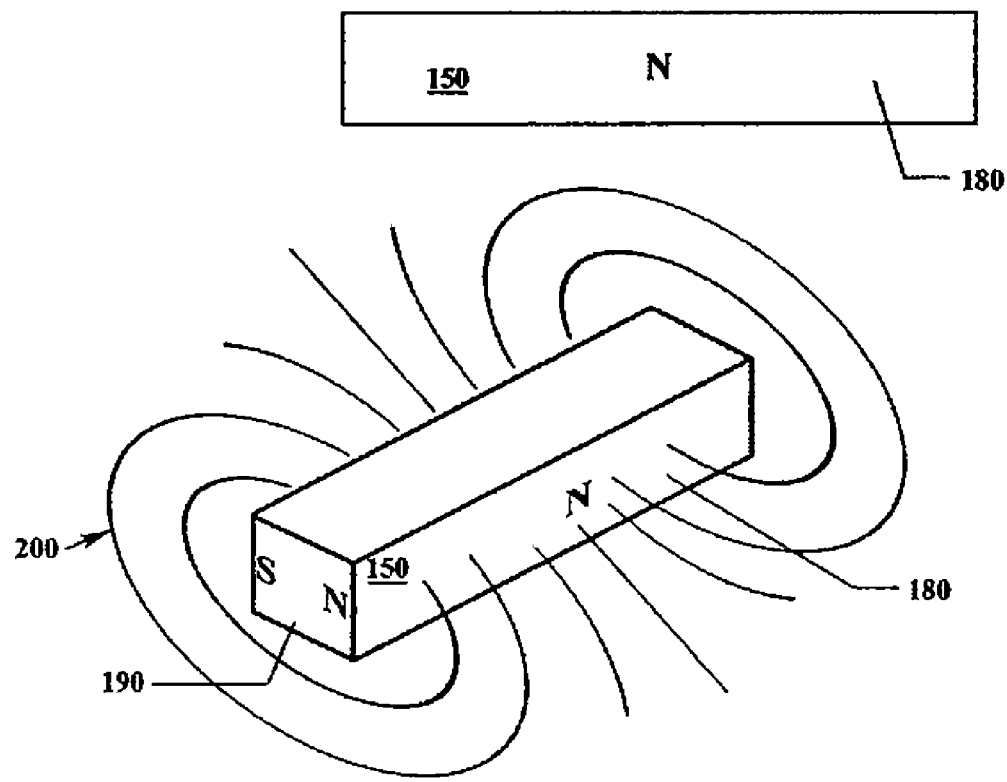
FIG. 5A includes several views illustrating one embodiment of the push magnet of the present invention without magnetic shielding.
Figure 5A:
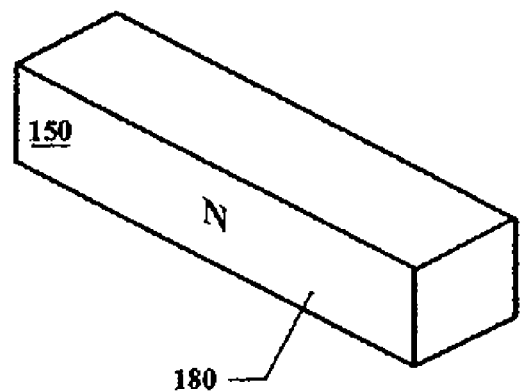
Figure 5B:
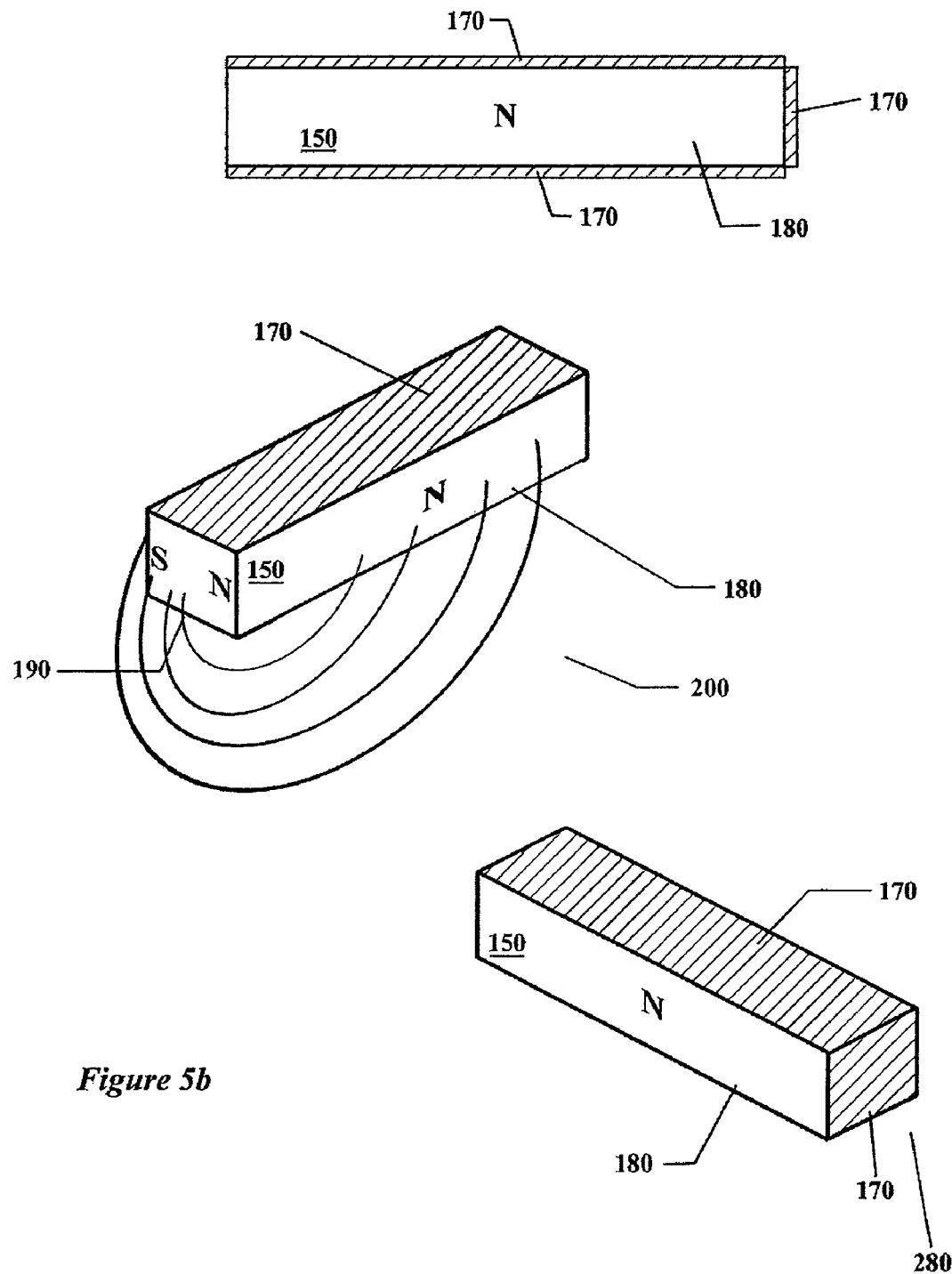
FIG. 5B includes several views illustrating one embodiment of the push magnet of the present invention with one configuration of magnetic shielding.

According to one embodiment of the present invention, as depicted in FIGS. 4 and 5B, the magnet cradle 170 covers all or part of all faces of the push magnet 150 except for the outermost face 180 and one end edge 190. Thus, the magnetic forces emanating from the exposed faces 180 and 190 are greater than the magnetic forces emanating from the unexposed faces. Magnetic field 200 created by a push magnet 150 without such shielding is depicted in FIG. 5A, whereas the magnetic field 200 created in the acceleration field generator 110 with the shielding of magnet cradle 170 is depicted in FIG. 5B. With further reference to FIG. 4, end edge 190, which is exposed and not shielded, is configured to face each motion magnet 120 as it enters the acceleration field. A shielded end edge 280 of push magnet 150 opposes end edge 190 and is configured to face each motion magnet 120 as it exits the acceleration field. The outermost face 180 of the push magnet 150 closest to motion magnet 120 faces inward towards the motion magnet 120 as it passes through the acceleration field.

Magnetic shielding material must be material with magnetic permeability. That is, material that will allow magnetic flux lines within it. Materials with higher magnetic permeability provide better magnetic shielding than those materials with lower magnetic permeability. In one embodiment, the magnet cradle 170 is typically manufactured from steel. Alternatively, those skilled in the art will recognize that other materials may be used to create the same effect for altering the magnetic field 200.

The two push magnets 150 of a spinner assembly 135 are generally positioned on opposite sides of the spinner axle 140, as illustrated in FIGS. 3 and 4. The outermost face 180 of the push magnet 150 on one side of the spinner axle 140 generally has the opposite polarity (i.e. north) than the polarity (i.e. south) of the outermost face 180 of the push magnet 150 on the opposite side of the same spinner axle 140, as is described in more detail below with reference to the motor 100 in operation. The spinner assemblies 135 are generally situated such that there is a spatial gap 310 between them large enough for a motion magnet 120 to pass through, as seen in FIG. 3.

In a further embodiment of the magnetic propulsion motor 100, the acceleration field generator 110 may comprise a plurality of spinner axle bearings 210 fixedly attached to the main frame 400. Each spinner axle 140 may pass through at least one spinner axle bearing 210 allowing the spinner axle 140 to rotate within the axle bearing 140. A spinner axle bearing 210 may be manufactured from any material known in the art, such as plastic, aluminum, stainless steel, etc. The friction between the spinner axle 140 and the spinner axle bearing 210 is sufficiently low to facilitate rotation of the push magnet 150.

Each spinner axle 140 may include at least one belt pulley 220 arranged at an end of the spinner axle 140, as shown in FIGS. 1 and 3. A belt 230 may be arranged around the belt pulley 220 of each spinner axle 140. Thus, all spinner axles 140 will rotate in unison.

A power supply 240 may further be provided to drive the rotation of the spinner axles 140. The power supply 240 may be an electric motor or any other means capable of driving the spinner axles 140. Where a belt 230 and belt pulley 220 system is employed, the power supply 240 may be used to drive the rotation of a first spinner axle 140, while the belt 230 and belt pulleys 220 will transfer the power to rotate the remaining spinner axles 140.

Figure 6:
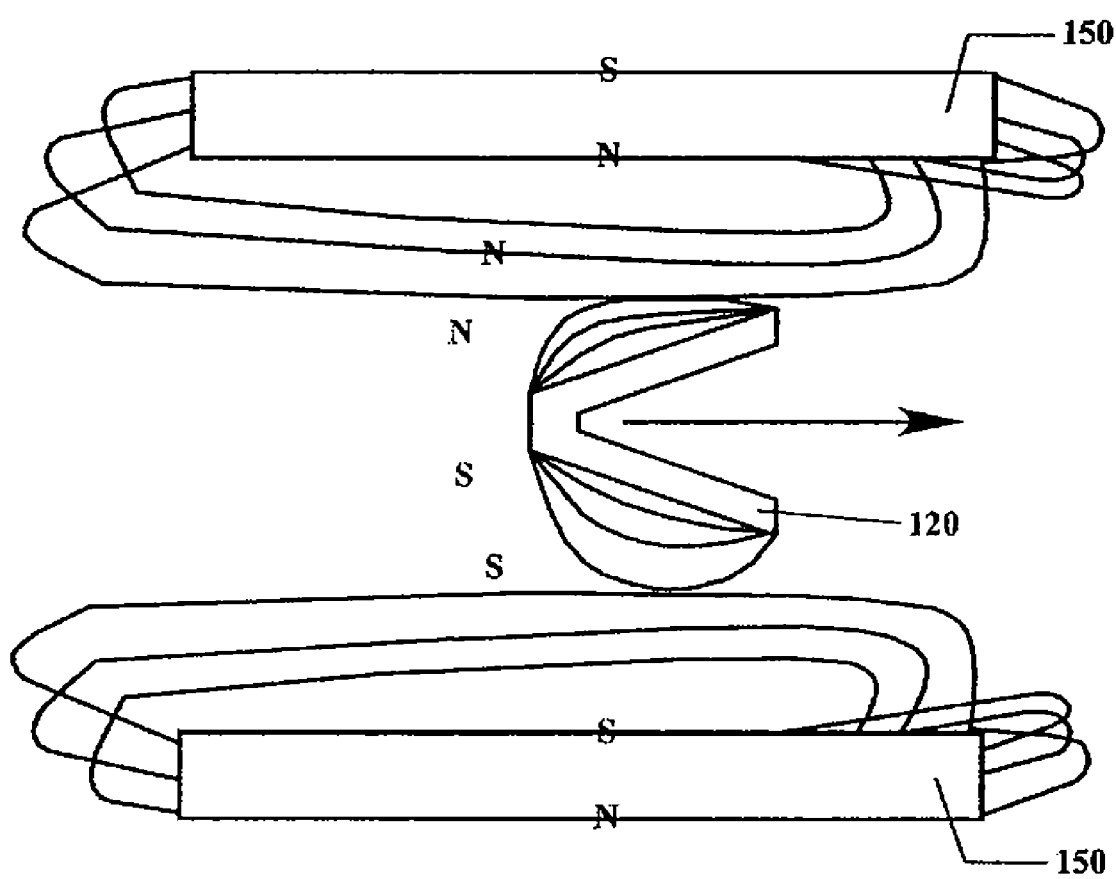
FIG. 6 is a schematic view of the magnetic fields created by one embodiment of the shielded push magnets and shielded motion magnet of the present invention.
Figure 7A:
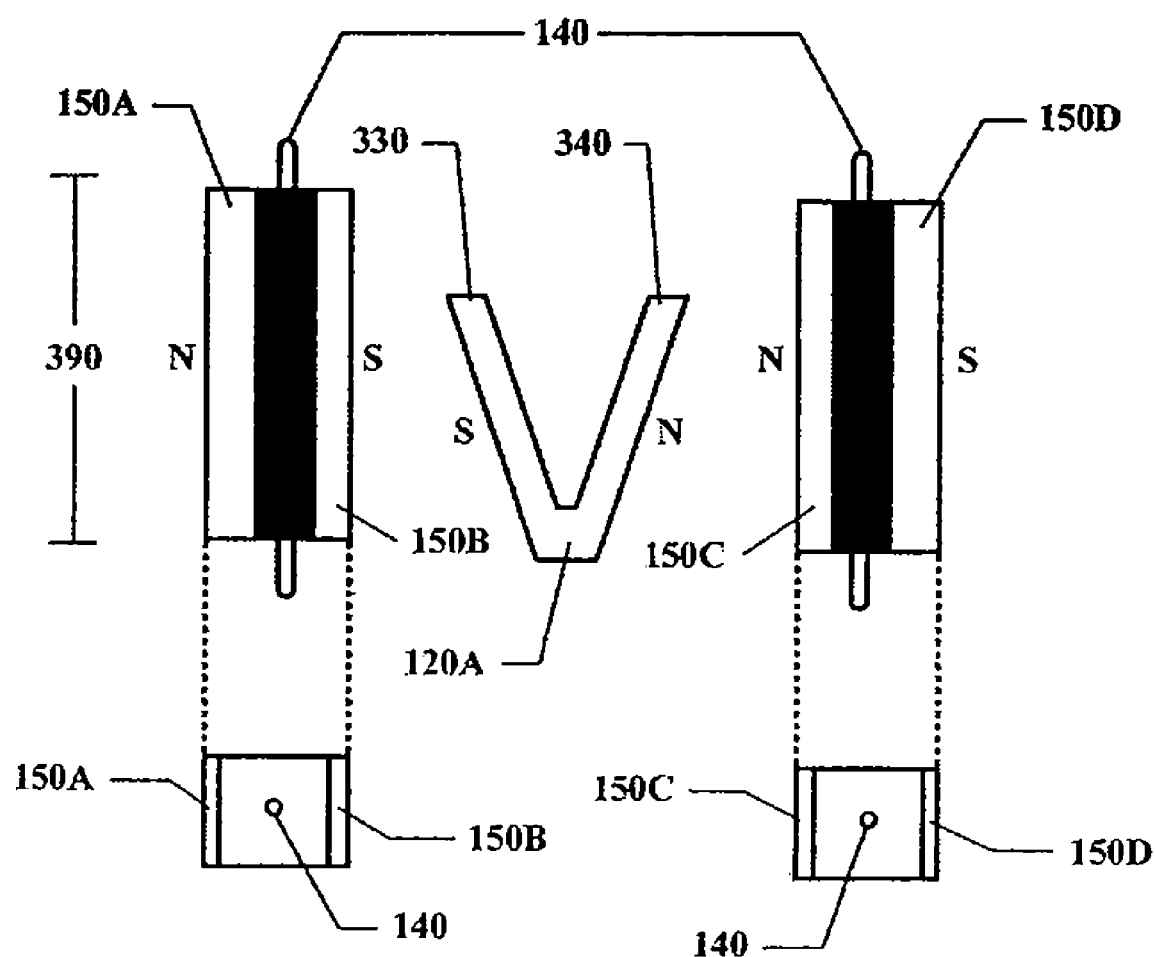
FIG. 7A is a schematic view of one stage of one embodiment of the push magnets and motion magnets of the present invention in operation illustrating a first motion magnet in home position.

As described, an acceleration chamber 105 of the magnetic propulsion motor 100 of the present invention further comprises at least one motion magnet 120. The motion magnets 120 are typically neodymium rare earth magnets; however, other magnets known in the art may be used instead of the neodymium magnets. The motion magnets 120 generally have the shape of the letter "V" or "U," as shown in FIGS. 6 and 7A, when viewed from the proximal end of the extension arm 380. In operation, the shape of the motion magnets 120 optimizes the magnetic force exerted on the motion magnets 120 by the push magnets 150, as illustrated in FIG. 6. Generally, a motion magnet 120 in the shape of a "V," or similar shape, has two extensions 330 and 340, as shown in FIG. 7A, and the two extensions have opposite magnetic polarity. For example, referring to motion magnet 120A in FIG. 7A, extension 340 has a north polarity and extension 330 has a south polarity.

Figure 8:
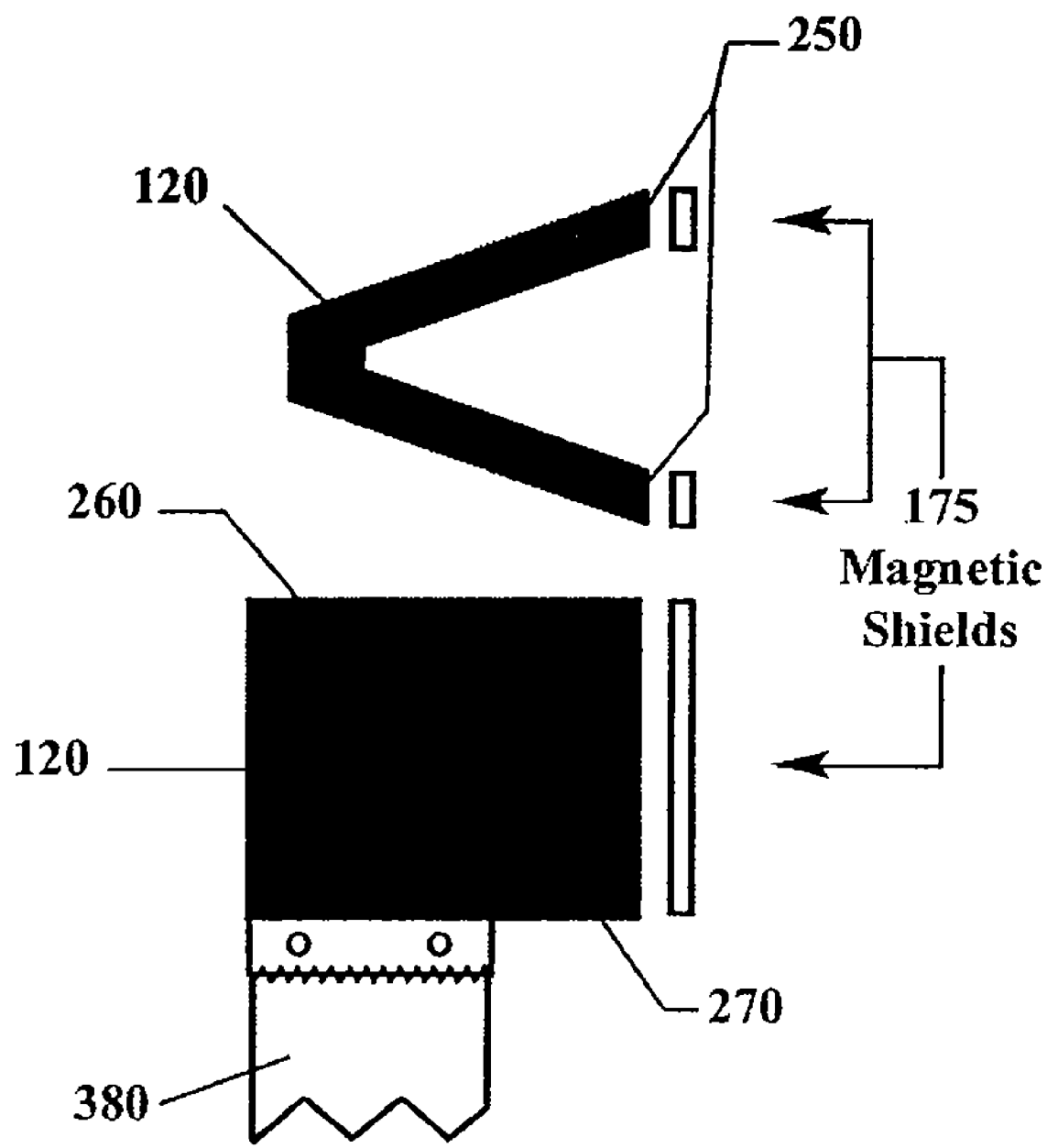
FIG. 8 is a top and side view of one embodiment of the motion magnet of the present invention.

Similar to the push magnets 150, the motion magnets 120 may further have magnetic shielding 175 to appropriately redirect the magnetic force emanating from desired edges. As shown in FIG. 8, according to one embodiment of the present invention, magnetic shielding 175 covers all or part of the surfaces located at the end of the extensions of the motion magnet 120. Additionally, magnetic shielding 175 may be secured to the upper 260 and lower 270 edge surfaces. Magnetic shielding 175, in one embodiment, creates a magnetic field around the motion magnet 120 that will interact more efficiently with the magnetic field created by the push magnets 150. Alternatively, the magnetic shielding 175 aids in minimizing or eliminating magnetic lock by limiting the repelling force created by the push magnets 150 acting against the motion magnet 120 as the motion magnet 120 enters the acceleration field generator 110. The magnetic shielding 175 is typically manufactured from the same material as the shielding material used for manufacturing the magnetic cradles 170.

Figure 9:
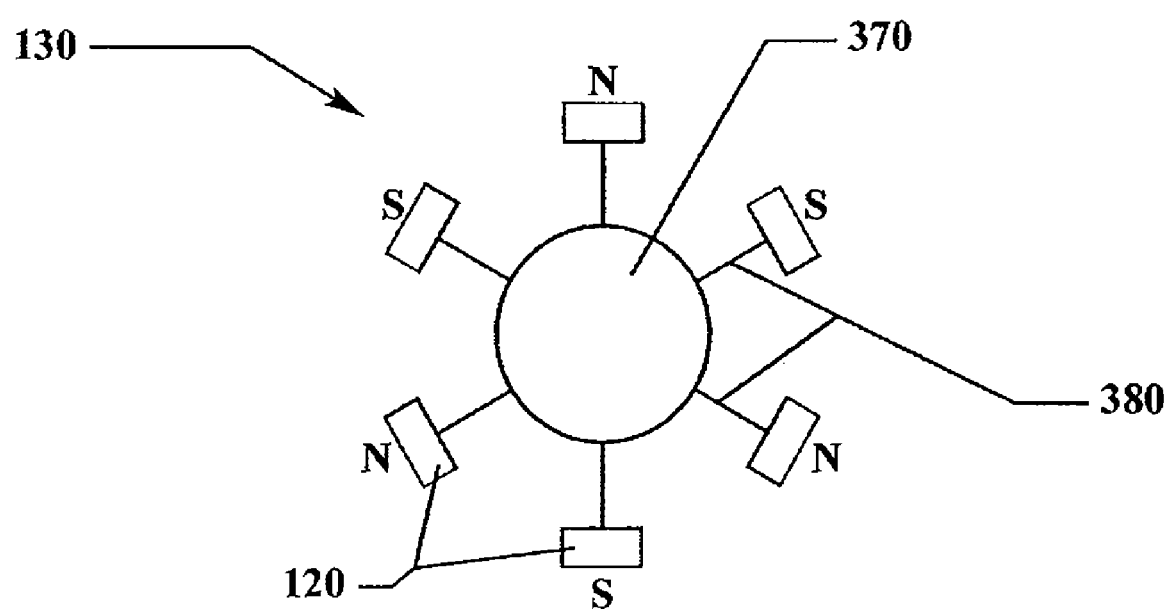
FIG. 9 is a side view of one embodiment of the rotating hub of the present invention.

As shown in FIG. 9, the rotating hub 130 generally comprises a base 370 and at least one extension arm 380. The extension arm 380 connects the motion magnet 120 to the base 370. In one embodiment of the present invention, a chamber 105 of the magnetic propulsion motor 100 has multiple motion magnets 120, and each motion magnet 120 is fixedly coupled to base 370 of rotating hub 130 by using an extension arm 380. Thus, the number of extension arms 380 coincides with the number of motion magnets 120. In alternative embodiments, each extension arm 380 may have more than one motion magnet 120. Each extension arm 380 is attached at one end to the base 370 such that the extension arms 380 are generally equally spaced circumferentially around the base 370. This arrangement appropriately balances the hub 130. At the opposite end of each extension arm 380, a motion magnet 120 is attached such that when the extension arms 380 are rotating in a forward motion, the open end of the "V" shaped motion magnets 120 enters into the spatial gap 310 of the acceleration field generator 110 before the vertex of the motion magnets 120, thereby causing ends 250 to enter the gap 310 first. The length of the extension arms 380 may be increased or decreased depending on the specific application. In a further embodiment, a chamber 105 of the magnetic propulsion motor 100 further comprises a main axle 160 coupled with the base 370, wherein the axle 160 rotates relative to the base 370.

According to one embodiment of the present invention, a chamber 105 of the magnetic propulsion motor 100 is configured to operate as follows. Rotating hub 130 is aligned such that a motion magnet 120 at the distal end of each extension arm 380 will pass through the spatial gap 310 of each of the acceleration field generators 110. In one embodiment, multiple extension arms 380 rotate along with rotating hub 130. Typically, it is desirable to provide an even number of extension arms 380 and motion magnets 120 to allow for the polarity of each edge 330 and 340 of the motion magnets 120 to be alternated as will be further discussed. Alternatively, there may only be one extension arm 380 and motion magnet 120.

Typically, each motion magnet 120 will be placed an equidistance from the center of the rotating hub 130. However, the motion magnets 120 may be placed at alternating or distinctive distances from the center of the rotating hub 130 in some embodiments.

As previously described, a chamber 105 of the magnetic propulsion motor 100 shown in FIG. 1 may comprise two acceleration field generators 110, each with a set of spinner assemblies 135. Alternatively, more or fewer acceleration field generators 110 may be desirable, and the motor shown in FIG. 1 may be modified accordingly. Generally, where more torque or power is desired, additional acceleration field generators 110 may be added. Furthermore, the acceleration field generators 110 will generally be evenly placed around the circumferential path of the motion magnets 120 and equidistance from the center of the rotating hub 130. Where two acceleration field generators 110 are used, they will typically be placed on opposite sides of the circumferential path of the motion magnets 120, as shown in FIG. 1.

Figure 7B:
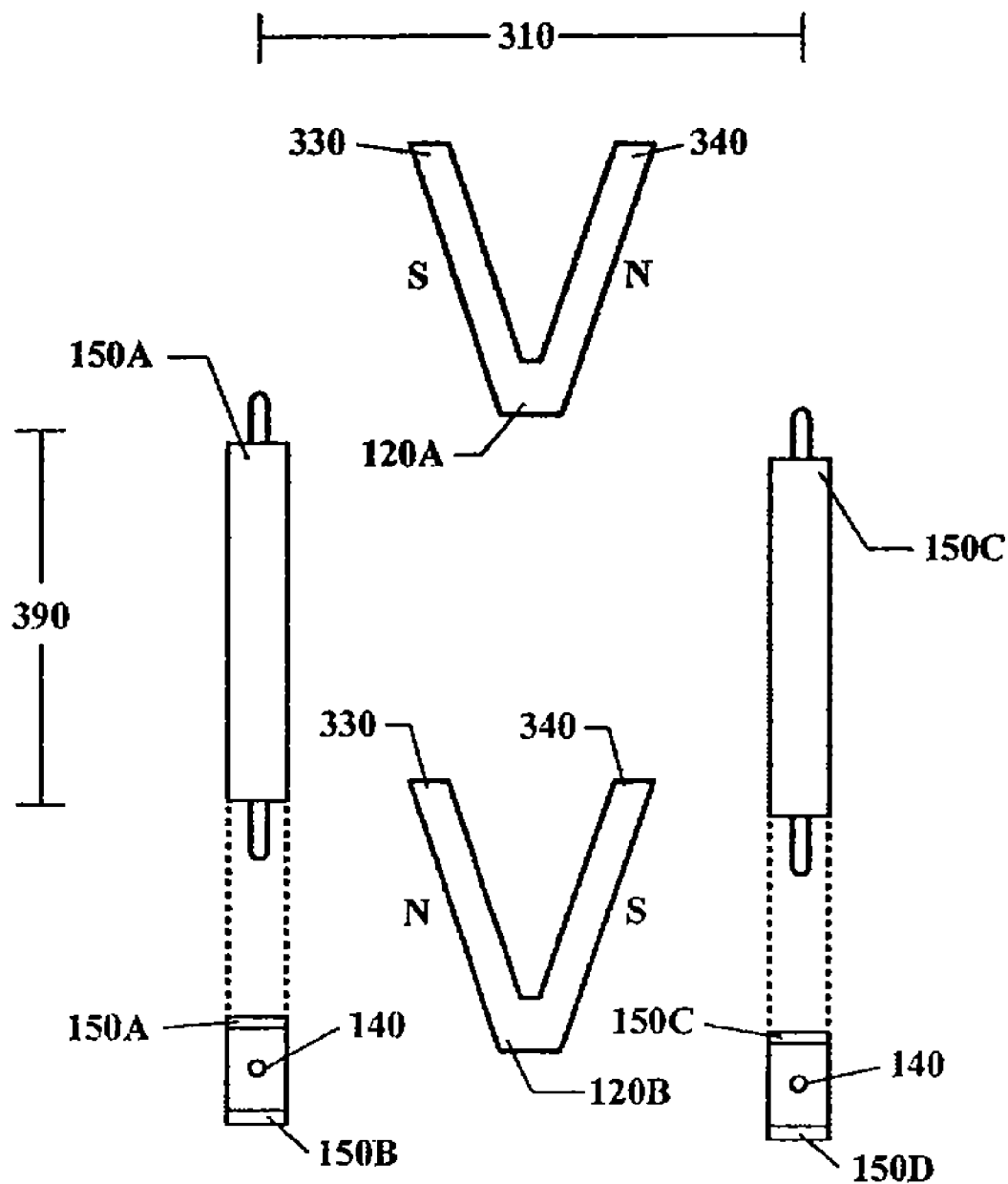
FIG. 7B is a schematic view of a second stage of one embodiment of the push magnets and motion magnets of the present invention in operation illustrating a first motion magnet exiting the acceleration field generator and a second motion magnet entering the acceleration field generator.
Figure 7C:
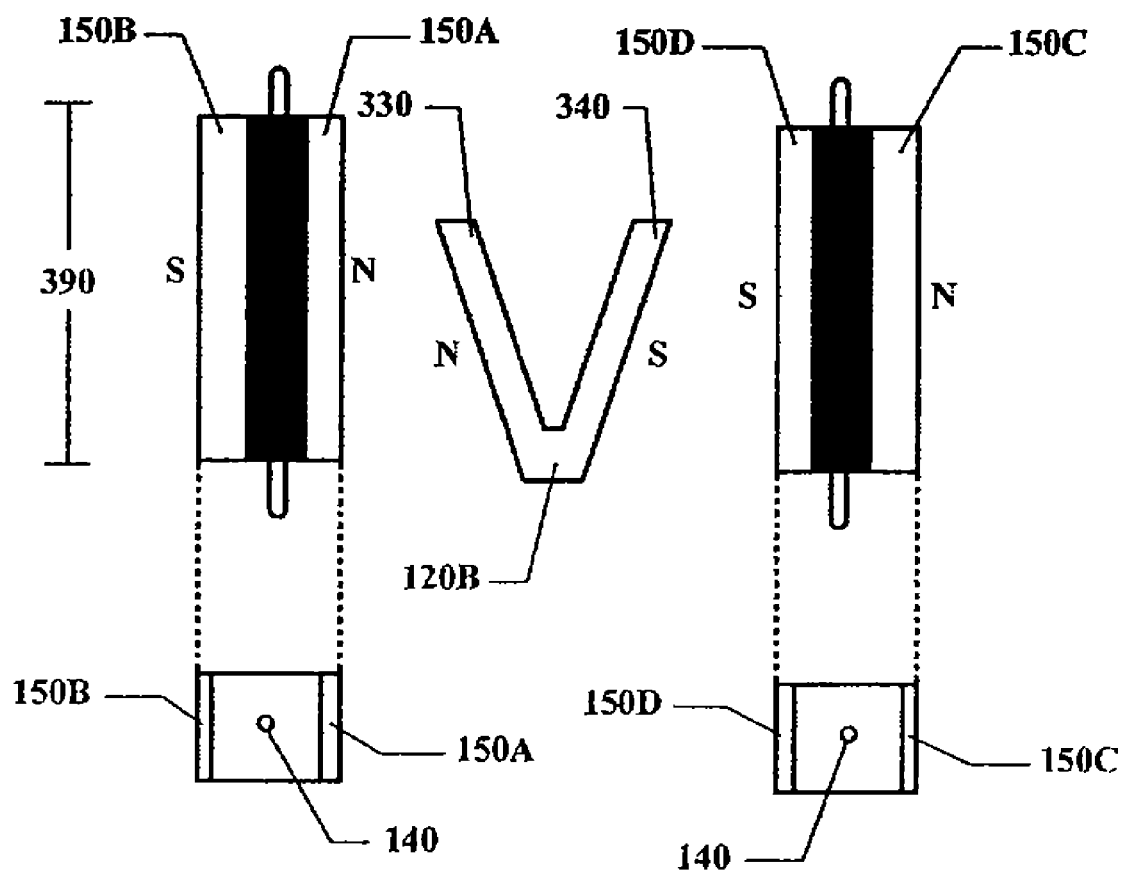
FIG. 7C is a schematic view of a third stage of one embodiment of the push magnets and motion magnets of the present invention in operation illustrating a second motion magnet in home position.

As previously described, each acceleration field generator 110 comprises two spinner axles 140, each having two push magnets 150 rotatable thereabout. The outermost faces 180 of the two push magnets 150 on the same spinner axle 140 have opposite polarities. Furthermore, the acceleration field generator 110 is typically configured such that, at any given moment, the outermost face 180 of the push magnet 150 facing into the gap 310 on one of the spinner assemblies 135 has the opposite polarity of the outermost face 180 of the push magnet 150 facing into the gap 310 on the other spinner assembly 135, as shown in FIGS. 7A and 7C. Push magnets 150 are aligned in such a manner due to the edges 330 and 340 of the motion magnets 120 having opposite polarities, as previously discussed.

In embodiments where more than one extension arm 380 is provided, extension arms 380 are ordered around the hub such that the motion magnet edges 330 and 340 alternate polarities from one motion magnet 120 to the next. For example, as illustrated in FIG. 7B, motion magnet 120A has a north polarity on edge 340 and a south polarity on edge 330, while the next subsequent motion magnet 120B has a south polarity on edge 340 and a north polarity on edge 330. This alternating pattern may be followed for all remaining motion magnets 120, which results in an even number of extension arms 380 and motion magnets 120.

In operation the push magnets 150 and the motion magnets 120 work together to create motion, torque, and power. Magnetic lock occurs in other systems when the motion magnets 120 require as much power to enter the magnetic field created by the acceleration field generator 110 as is generated leaving the magnetic field. In the present invention the push magnets 150 are taken out of position to affect the conflicting magnetic field created by the motion magnets 120 and then brought back into the proper position at the appropriate time, thereby minimizing or mitigating magnetic lock. When push magnets 120 are removed or reintroduced into the proper position too early or too late, the motor 100 would lose torque and power. The timing of the motion of the push magnets 150 and the motion magnets 120 of the present invention allows for magnetic lock to be minimized or bypassed.

According to one aspect of the magnetic propulsion motor 100 of the present invention, the timing of the positioning of the push magnets 150 in relation to the motion magnets 120 that avoids the magnetic lock is now described. The positioning of the push magnets 150 of the present invention will be described with reference to a spinning motion of push magnets 150. However, other motions or combination of motions creating a similar effect can be employed, such as moving, vibrating, pushing, pulling, raising and/or lowering the push magnets 150 away from the motion magnets 120 at the appropriate time. The overall effect of the motion is to bring the push magnets 150 away from the magnetic field of the acceleration field generator 110.

Referring to FIGS. 7A, 7B, 7C and 7D, the push magnets 150 have been numbered 150A, 150B, 150C and 150D for easier reference while describing the magnetic propulsion motor 100 in operation. Similarly, the motion magnets 120 that are visible in these drawings have been numbered 120A, 120B and 120C.

Referring now to FIG. 7A, motion magnet 120A is in "home" position. Home position represents the position at which a motion magnet 120 is approximately equidistance from the entrance and exit of the acceleration field. Typically, this point is where the motion magnet 120 is positioned generally at the midpoint of distance 390. At home position, the push magnets 150B and 150C, which are nearest the motion magnet edges 330 and 340 and are part of separate spinner assemblies 135, are generally facing one another directly. The two directly facing push magnets 150B and 150C, thus described, have opposite polarities. For example, as shown in FIG. 7A, push magnet 150B has a south polarity while push magnet 150C has a north polarity. Additionally, as illustrated earlier, each push magnet 150B and 150C will have the same polarity as the nearest edge of the motion magnet 120A, which is at the center of the acceleration field. For example, as shown in FIG. 7A, push magnet 150B and motion magnet edge 330 both have a south polarity while push magnet 150C and motion magnet edge 340 have a north polarity. This creates the repelling force necessary to accelerate the motion magnet 120A through the acceleration field. The field created in gap 310 will also create an attracting force to pull in the next subsequent motion magnet 120B, as shown in FIG. 7B. This force causes rotating hub 130, and therefore motion magnets 120, to rotate about main axle 160.

Meanwhile, as belt 230 causes belt pulley 220 to rotate each spinner axle 140 in unison, push magnets 150A and 150C rotate to an "upward" position and push magnets 150B and 150D rotate to a "downward" position, as seen in FIG. 7B. This motion causes motion magnet 120A to exit the acceleration field generator 110 and magnet 120B to enter the acceleration field generator 110. During this motion, the spinner assemblies 135 continue to rotate such that the push magnets 150 are equidistance from the center of gap 310, as illustrated in FIG. 7B. This is generally the same position that the spinner assemblies 135 are in as the next approaching motion magnet 120B nears the entrance to the acceleration field generator 110.

Referring now to motion magnet 120B shown FIG. 7C, when nearing the entrance to the acceleration field generator 110, push magnets 150A and 150D continue to rotate relative the spinner axles 140 such that they will be approaching a position where they will be directly facing one another. When motion magnet 120B enters into this second "home" position as shown in FIG. 7C, push magnets 150A and 150D will generally be directly facing one another. As previously illustrated, when motion magnet 120B is in home position, push magnet 150A and motion magnet edge 330 both have the same polarity, i.e. north, while push magnet 150D and motion magnet edge 340 similarly have the same polarity, i.e. south. As described earlier, this creates both the repelling force necessary to expel motion magnet 120B from the acceleration field and attract motion magnet 120C into the acceleration field. One illustration of the magnetic field lines created in one embodiment of the present invention wherein a motion magnet 120 is in substantially the home position is depicted in FIG. 6.

Figure 7D:
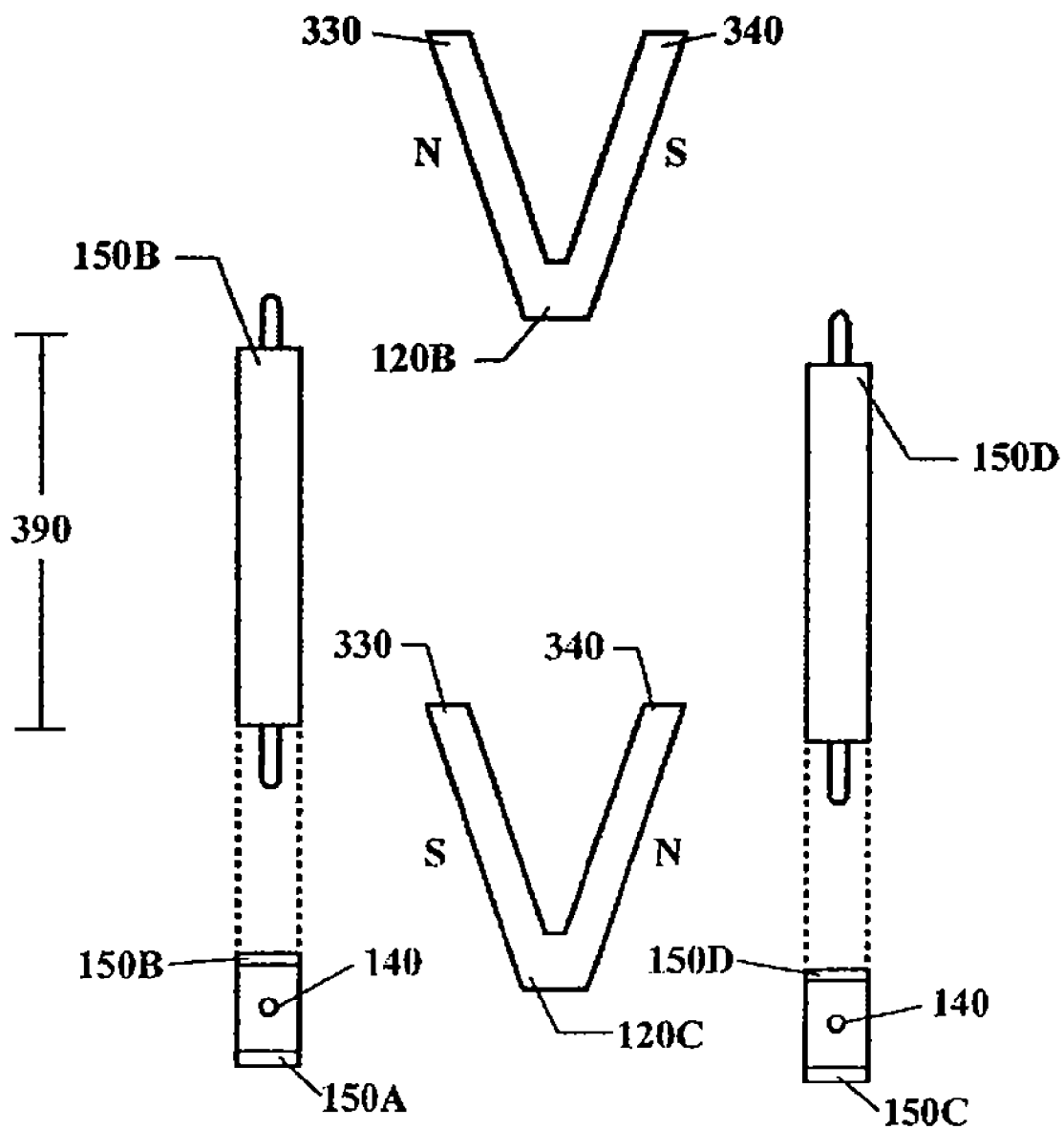
FIG. 7D is a schematic view of a fourth stage of one embodiment of the push magnets and motion magnets of the present invention in operation illustrating a second motion magnet exiting the acceleration field generator and a third motion magnet entering the acceleration field generator.

While motion magnet 120B is exiting the acceleration field generator 110, the spinner assemblies 135 will generally be rotating such that the push magnets 150 are equidistance from the center of gap 310, as illustrated in FIG. 7D. This is generally the same position that the spinner assemblies 135 are in as the next approaching motion magnet 120C, having similar characteristics as motion magnet 120A, nears the entrance to the acceleration field generator 110. Alternatively, motion magnet 120C could be motion magnet 120A rotating through the acceleration field generator 110 once again.

The timing of the position of the push magnets 150 and motion magnets 120, thus described, provides for at least two resulting effects. First, an exiting motion magnet, e.g. motion magnet 120A, will be pushed away from the acceleration field, while the next subsequent motion magnet, e.g. motion magnet 120B, which is entering the acceleration field, will be attracted towards the acceleration field. Second, the push/pull effect, thus described, extends the duration of the torque resulting from the rotation of the hub 130. This duration lasts for approximately the time during which a motion magnet 120 passes along the length of a push magnet 150. Each motion magnet 120 passing through an acceleration field generator 110 will feel both an attracting force entering the field and a repelling force exiting the field. This dual action will double the duration that a motion magnet 120 is being acted on by magnetic forces. Whereas employing solely a push technique or a pull technique would result in a shorter, staccato-like duration. Furthermore, as previously mentioned, the push/pull effect minimizes magnetic lock or backlash effect. Backlash happens where the forces of the push magnets 150 want to reverse the forward motion of the motion magnets 120. Backlash is avoided in the present invention because a motion magnet 120 that is approaching an acceleration field generator 110 is attracted towards the generator 110 and then repelled out.

The magnetic propulsion motor 100 creates energy without pollution. The motor 100 of the present invention can be used to replace any constant RPM motor, such as pumps, electric motors, generators or compressors. There are no size limitations or restrictions inhibiting the use of the magnetic propulsion motor 100 of the present invention.

Although the present invention has been described with reference to preferred embodiments, persons skilled in the art will recognize that changes may be made in form and detail without departing from the spirit and scope of the invention. For example, the distance that the push magnets 150 are from the motion magnets 120 will determine the strength of the attracting and repelling forces. Similarly, the size and/or dimensions of the push magnets 150 and motion magnets 120 will increase or decrease the strength of the attracting and repelling forces. Changing the strength of the attracting and repelling forces will change the amount of torque and power created.

I claim:

1. A magnetic motor, comprising:
    a magnetic drive assembly comprising a drive magnet and a drive axis, said drive magnet being rotatably disposed about said drive axis;
    a rotating hub rotatably disposed about a main axis, wherein the rotating hub is independently rotatable relative to the magnetic drive assembly;
    a motion magnet fixedly attached to said rotating hub, such that rotation of said motion magnet about the rotating hub causes said motion magnet to pass proximate to said magnetic drive assembly; and a driving force applied to said magnetic drive assembly for causing said drive magnet to rotate about said drive axis thereby driving said motion magnet to rotate whereby:

said drive magnet rotates to a position proximal to said motion magnet when said motion magnet is in a position proximate to said magnetic drive assembly, wherein like magnetic poles of said drive magnet and said motion magnet are directed towards each other when said motion magnet is in said position proximate to said magnetic drive assembly thereby exerting a repelling force on said motion magnet from said drive magnet as said motion magnet rotates away from said magnetic drive assembly, and said drive magnet rotates to a position distal to said motion magnet as said motion magnet approaches said position proximate to said magnet drive assembly thereby minimizing the repelling force exerted on said motion magnet from said drive magnet as said motion magnet rotates towards said magnetic drive assembly;

wherein the motion magnet is substantially V-shaped, having a first end and a second end, the first end and the second end having opposite magnetic polarities.

2. The magnetic motor of claim 1, wherein said drive magnet comprises a magnetic shielding layer on at least one side thereof for enhancing the repelling force on said motion magnet from said drive magnet.

3. The magnetic motor of claim 1, wherein said motion magnet comprises a magnetic shielding layer on at least one side thereof for enhancing the repelling force on said motion magnet from said drive magnet.

4. The magnetic motor of claim 1, further comprising:
a second rotating hub rotatably disposed about the main axis, wherein the second rotating hub is independently rotatable relative to the magnetic drive assembly; and
a second motion magnet fixedly attached to the second rotating hub.

5. The magnetic motor of claim 4, wherein the rotation of the second motion magnet about the second rotating hub causes the second motion magnet to pass proximate to said magnetic drive assembly; and
the drive magnet rotates to a position proximal to the second motion magnet when the second motion magnet is in a position proximate to the magnetic drive assembly, wherein like magnetic poles of the drive magnet and the second motion magnet are directed towards each other when the second motion magnet is in the position proximate to the magnetic drive assembly thereby exerting a repelling force on the second motion magnet from the drive magnet as the second motion magnet rotates away from the magnetic drive assembly, and
the drive magnet rotates to a position distal to the second motion magnet as the second motion magnet approaches the position proximate to the magnet drive assembly thereby minimizing the repelling force exerted on the second motion magnet from the drive magnet as the second motion magnet rotates towards the magnetic drive assembly.

6. A magnetic motor, comprising:
a magnetic drive assembly comprising a first drive magnet, a second drive magnet, and a drive axis, said first drive magnet and said second drive magnet being rotatably disposed about said drive axis;

a rotating hub, independent from the magnetic drive assembly, rotatably disposed about a main axis;

a motion magnet fixedly attached to said rotating hub, such that rotation of said motion magnet about the rotating hub causes said motion magnet to pass proximate to said magnetic drive assembly; and a driving force applied to said magnetic drive assembly for causing said first drive magnet and said second drive magnet to rotate about said drive axis thereby driving said motion magnet to rotate whereby:

said first drive magnet rotates to a position proximal to said motion magnet and said second drive magnet rotates to a position distal to said motion magnet when said motion magnet is in a position proximate to said magnetic drive assembly, wherein like magnetic poles of said first drive magnet and said motion magnet are directed towards each other when said motion magnet is in said position proximate to said magnetic drive assembly thereby exerting a repelling force on said motion magnet from said first drive magnet as said motion magnet rotates away from said magnetic drive assembly, and wherein a magnetic pole of said second drive magnet opposite to the magnetic pole of said motion magnet directed towards said first magnet is directed away from said motion magnet thereby minimizing an attracting force exerted on said motion magnet from said second drive magnet as said motion magnet rotates away from said magnetic drive assembly, and said first drive magnet rotates to a position distal to said motion magnet and said second drive magnet rotates to a position proximal to said motion magnet as said motion magnet approaches said position proximate to said magnet drive assembly thereby minimizing the repelling force exerted on said motion magnet from said first drive magnet as said motion magnet rotates towards said magnetic drive assembly, and thereby exerting an attracting force on said motion magnet from said second drive magnet as said motion magnet rotates towards said magnetic drive assembly.

7. The magnetic motor of claim 6, wherein said first drive magnet comprises a magnetic shielding layer on at least one side thereof for enhancing the repelling force exerted on said motion magnet from said first drive magnet.

8. The magnetic motor of claim 6, wherein said motion magnet comprises a magnetic shielding layer on at least one side thereof for enhancing the repelling force exerted on said motion magnet from said first drive magnet.

9. A magnetic motor, comprising:
a magnetic drive assembly comprising a drive magnet and a drive axis, said drive magnet being rotatably disposed about said drive axis;
a rotating hub rotatably disposed about a main axis;
a motion magnet fixedly attached to said rotating hub, such that rotation of said motion magnet about the rotating hub causes said motion magnet to pass proximate to said magnetic drive assembly; and
a driving force applied to said magnetic drive assembly for causing said drive magnet to rotate about said drive axis thereby driving said motion magnet to rotate whereby:
said drive magnet rotates to a position proximal to said motion magnet when said motion magnet is in a position proximate to said magnetic drive assembly, wherein like magnetic poles of said drive magnet and said motion magnet are directed towards each other when said motion magnet is in said position proximate to said magnetic drive assembly thereby exerting a repelling force on said motion magnet from said drive magnet as said motion magnet rotates away from said magnetic drive assembly, and said drive magnet rotates to a position distal to said motion magnet as said motion magnet approaches said position proximate to said magnet drive assembly thereby minimizing the repelling force exerted on said motion magnet from said drive magnet as said motion magnet rotates towards said magnetic drive assembly;

wherein said drive magnet comprises a magnetic shielding layer on at least one side thereof for enhancing the repelling force on said motion magnet from said drive magnet.

10. The magnetic motor of claim 9, wherein said motion magnet comprises a magnetic shielding layer on at least one side thereof for enhancing the repelling force on said motion magnet from said drive magnet.

11. The magnetic motor of claim 10, wherein the motion magnet has a first end and a second end, the first end and the second end having opposite magnetic polarities.

12. The magnetic motor of claim 11, wherein the motion magnet is V-shape.

13. A magnetic motor, comprising:
a magnetic drive assembly comprising a drive magnet and a drive axis, said drive magnet being rotatably disposed about said drive axis;
a rotating hub rotatably disposed about a main axis;
a motion magnet fixedly attached to said rotating hub, such that rotation of said motion magnet about the rotating hub causes said motion magnet to pass proximate to said magnetic drive assembly; and
a driving force applied to said magnetic drive assembly for causing said drive magnet to rotate about said drive axis thereby driving said motion magnet to rotate whereby:
    said drive magnet rotates to a position proximal to said motion magnet when said motion magnet is in a position proximate to said magnetic drive assembly, wherein like magnetic poles of said drive magnet and said motion magnet are directed towards each other when said motion magnet is in said position proximate to said magnetic drive assembly thereby exerting a repelling force on said motion magnet from said drive magnet as said motion magnet rotates away from said magnetic drive assembly, and
    said drive magnet rotates to a position distal to said motion magnet as said motion magnet approaches said position proximate to said magnet drive assembly thereby minimizing the repelling force exerted on said motion magnet from said drive magnet as said motion magnet rotates towards said magnetic drive assembly
wherein said motion magnet comprises a magnetic shielding layer on at least one side thereof for enhancing the repelling force on said motion magnet from said drive magnet.

14. The magnetic motor of claim 13, wherein said drive magnet comprises a magnetic shielding layer on at least one side thereof for enhancing the repelling force on said motion magnet from said drive magnet.

* * * * *